US005644465A

United States Patent [19]

Lange et al.

[11] Patent Number: 5,644,465

[45] Date of Patent: Jul. 1, 1997

[54] SURGE ARRESTER WITH EXTERNAL SHORT-CIRCUIT DEVICE

[75] Inventors: Gerhard Lange; Thomas Westebbe; Michael Bluhm, all of Berlin, Germany

[73] Assignee: Siemens Aktiengesellschaft, München, Germany

[21] Appl. No.: 522,352

[22] PCT Filed: Feb. 25, 1994

[86] PCT No.: PCT/DE94/00217

§ 371 Date: Oct. 30, 1995

§ 102(e) Date: Oct. 30, 1995

[87] PCT Pub. No.: WO94/22191

PCT Pub. Date: Sep. 29, 1994

[30] Foreign Application Priority Data

Mar. 17, 1993 [DE] Germany .......................... 43 09 331.0

[51] Int. Cl.[6] .............................. H02H 9/06

[52] U.S. Cl. .......................... 361/120; 361/129; 361/124; 337/32

[58] Field of Search ............................ 361/111, 117–120, 361/124–127; 337/28, 31–33

[56] References Cited

U.S. PATENT DOCUMENTS

| | | | |
|---|---|---|---|
| 4,851,957 | 7/1989 | Chung | 361/124 |
| 4,910,489 | 3/1990 | Neuwirth et al. | 337/32 |
| 4,912,592 | 3/1990 | Flindall et al. | 361/120 |
| 4,984,125 | 1/1991 | Uwano | 361/124 |
| 5,027,100 | 6/1991 | Neuwirth et al. | 337/32 |
| 5,029,302 | 7/1991 | Masghati et al. | 337/32 |

FOREIGN PATENT DOCUMENTS

| | | |
|---|---|---|
| 2625377 | 6/1989 | France . |
| 2230900 | 10/1990 | United Kingdom . |
| WO90/13904 | 11/1990 | WIPO . |

*Primary Examiner*—Jeffrey A. Gaffin
*Assistant Examiner*—Ronald W. Leja
*Attorney, Agent, or Firm*—Kenyon & Kenyon

[57] ABSTRACT

In a three-electrode surge arrester where the center electrode (3) is provided with a connecting wire (6) that projects outward radially and is provided with an outside short-circuit device, the latter consists of a two-arm spring clip (20) whose arms project axially beyond the free ends of the end electrodes and are in contact with the outside peripheral edge of the respective end electrode (1, 2) with a layer of insulating film (21) in between. Spring clip (20) has an roof-shaped arch (24) and is provided with a passage in the area of this arch that serves to secure the spring clip on connecting wire (6) of center electrode (3).

9 Claims, 1 Drawing Sheet

SURGE ARRESTER WITH EXTERNAL SHORT-CIRCUIT DEVICE

BACKGROUND OF THE INVENTION

The present invention concerns the field of electric components and is intended for use in designing a gas-filled three-electrode surge arrester equipped with an external short-circuit device. Such a short-circuit device is used to protect the surge arrester in the event of a long-time load. As a rule, such a short-circuit device has a component that melts at high temperatures and short-circuits the center electrode and one or both of the end electrodes.

With a known three-electrode surge arrester of this type, the outside short-circuit device consists of a two-arm spring clip, arched in a roof-shaped manner, that extends in the axial direction of the surge arrester, where its arms form an obtuse angle and its free ends are in contact with the end electrodes with a meltable layer of insulation in between. The outermost ends of the two arms are bent slightly so that these ends run parallel to the axis of the surge arrester and consequently are in contact with the outer peripheral surface of the end electrodes. With this known short-circuit device, the spring clip is provided with a passage in the middle through which it is attached to the radially projecting connecting wire of the center electrode. In this way the spring clip can be attached to the connecting wire with an initial tension as in French patent A 2,625,377.

With another known surge arrester, a two-arm spring clip is attached to the center electrode at the center. The two free ends of the arms of this spring clip are in insulated contact with the outside surfaces of the end electrodes. With this surge arrester, the spring clip serves to create a short-circuit device and also to form parallel spark gaps in air. A layer of insulation 20 to 40 μm thick made of polyurethane varnish, for example, is applied to the ends of the two arms of the spring clip. The middle part of the spring clip is connected to the radially projecting connecting wire of the center electrode as in U.S. Pat. No. 4,912,592.

With yet another known surge arrester, a spring clip is again provided as an external short-circuit device. The arms of the spring clip here project beyond the end electrodes of the surge arrester in the axial direction and their ends are in insulated contact with the end electrodes at the ends, in other words, axially. To secure the wing-like spring clip, it is provided with a passage in the center in the form of a punched-out H shape, and the connecting wire of the center electrode is inserted between the tabs of the H shape. The spring clip is attached to the connecting wire in a prestressed state by means of the springy tabs (WO 90/13904).

SUMMARY OF THE INVENTION

The present invention provides a design of a spring clip for a gas-filled surge arrester. In that design a reliable contact with the end electrodes is assured.

To achieve this object, the free ends of the spring clip in the design according to this invention project axially beyond the end electrodes and are in contact with the peripheral outside edge of the respective end electrode.

With an external short-circuit device of such a design, the arms of the spring clip are in point contact with the end electrodes with a sufficient initial tension. Thus, when the insulation layer melts because the arms of the spring clip are in a point contact with the respective end electrode.

The reliability of a point contact can be increased by providing two straps on the ends of the arms of the spring clip so they are in contact with the peripheral edge of the respective end electrode. This also provides torsional security for the spring clip. Such a design of the spring clip is especially suitable for surge arresters where the connecting wires for all the electrodes run radially in the same direction. The roof-shaped arch in the spring clip is preferably such that the arms form an obtuse angle of about 110°–150° when not under load. The method of securing the spring clip to the center electrode or its connecting wire or terminal pin may be either by means of a material bond or especially by means of a form-fitting connection. It may be secured by a solder joint, for example, where a hole having a diameter that matches the diameter of the connecting wire is provided in the area of the roof-shaped arch in the spring clip, which is then secured to the connecting wire of the center electrode in the pre-stressed state, or a pinch sleeve may be pushed onto the connecting wire of the center electrode to secure it. In this design, the spring clip also has a hole in the area of the roof-shaped arch and is secured in the pre-stressed state by means of a pinch sleeve. It is especially advantageous from the standpoint of assembly to have an H shape punched out of the spring clip in the area of the roof-shaped arch so as to form two springy tabs, where the distance between the two tabs is smaller than the diameter of the connecting wire of the center electrode, and it is also advantageous to secure the spring clip on the connecting wire in the pre-stressed state by means of these tabs. A drop of plastic or soft solder may be placed on one or both tabs at the point of contact with the connecting wire as a twist-preventing option for the spring clip.

BRIEF DESCRIPTION OF THE DRAWINGS

Three embodiments of this invention are illustrated in the attached drawings.

DETAILED DESCRIPTION

Figure 1:
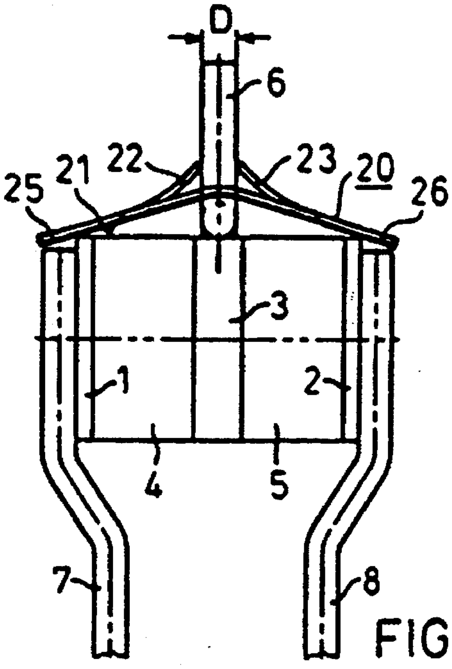
FIGS. 1 and 2 show two views of a three-electrode surge arrester with an attached short-circuit device, where the connecting wire of the center electrode is arranged on the opposite side radially from the connecting wires of the end electrodes.
Figure 2:
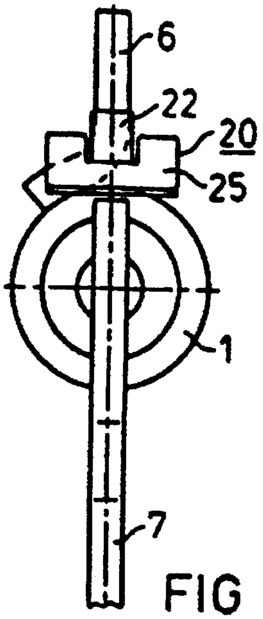

The surge arrester according to FIGS. 1 and 2 consists of two end electrodes 1 and 2, center electrode 3 and two ceramic insulators 4 and 5 that also act as spacers for the electrodes. Connecting wire 6 is welded to the center electrode and projects radially upward. Connecting wires 7 and 8 are welded to the two end electrodes 4 and 5 and run radially downward.

This surge arrester is also provided with an external short-circuit device consisting of spring clip 20 and an insulating film 21 between the spring clip and end electrodes 1 and 2.

Figure 3:
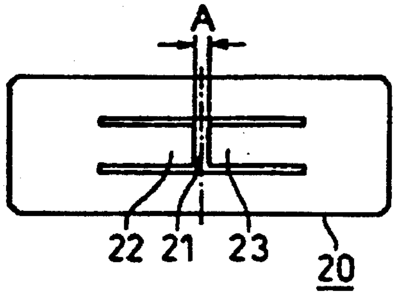
FIGS. 3 and 4 show two views of a spring clip with an H-shaped area punched out of it.
Figure 4:
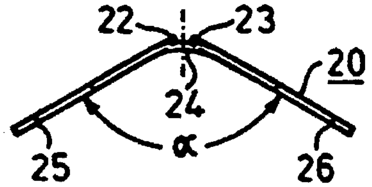

A metal strip that is provided with a symmetrical H shape 21 punched out of the central area forms spring clip 20 according to FIG. 3, thus forming tabs 22 and 23, where the distance A between them is smaller than the diameter D of the connecting wire 6 of the center electrode. Metal strip 20 according to FIG. 3 is curved to form the spring clip in the design according to FIG. 4 so as to create a roof-shaped structure 24. The two arms 25 and 26 of the spring clip then form an angle $\alpha$ of approx. 120°.

When spring clip 20 is placed on connecting wire 6, tabs 22 and 23 are elastically bent out from their resting position, and the edges of the tabs engage the surface of connecting wire 6, so the spring clip is secured in a certain position where the ends of arms 25, 26 are under an initial tension. The extent of the initial tension depends on how far the spring clip with its roof-shaped arch is pressed in the direction of the center electrode. To prevent twisting, the spring clip can be secured in the desired position by means of a drop of soft solder or plastic placed at the point of contact of the tabs with the connecting wire.

Figure 6:
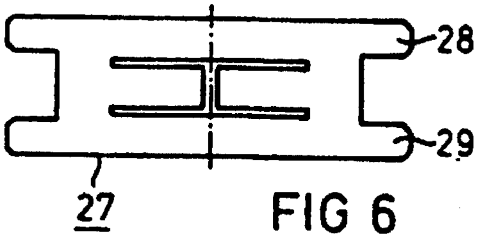
FIGS. 5 and 6 show a three-electrode surge arrester with a short-circuit device where the connecting wires of the electrodes project radially in the same direction.
Figure 5:
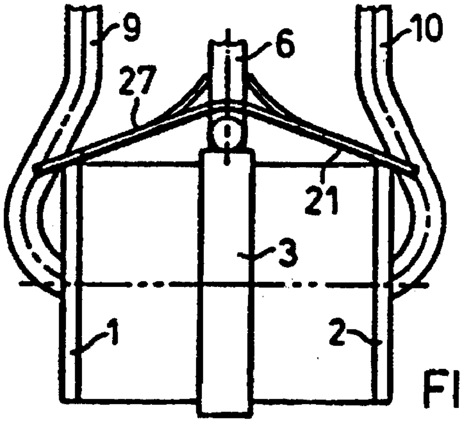

With the surge arrester according to FIG. 5, connecting wire 6 for the center electrode and connecting wires 9 and 10 for the end electrodes run radially in the same direction. According to FIG. 6, the ends of the spring clip are provided with a recess that prevents spring clip 27 from coming in contact with connecting wires 9 and 10. In this manner, two tabs 28 and 29 are formed that are in point contact with the outside edge of the respective end electrode 1, 2. This design also prevents twisting.

Figure 7:
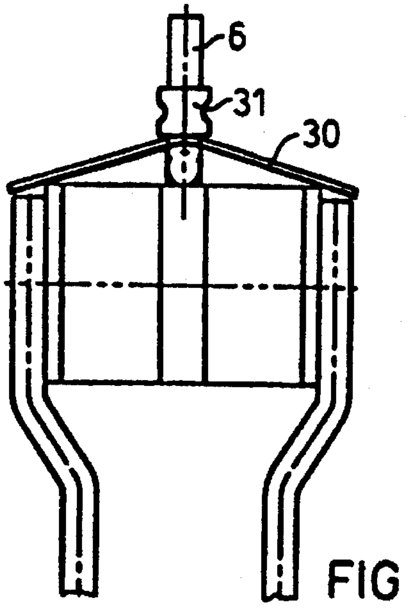
FIG. 7 shows an alternative method of attaching the spring clip to the connecting wire.

FIG. 7 shows how spring clip 30 is attached to connecting wire 6 by a pinch sleeve 31, with the spring clip provided with a hole in the area of the roof-shaped arch.

What is claimed is:

1. A gas-filled surge arrester comprising:

two axially opposed cylindrical end electrodes;

a ring-shaped center electrode;

a connecting wire coupled to said center electrode, said connecting wire extending radially outward from said center electrode;

two hollow cylindrical insulators, wherein one of the two hollow cylindrical insulators is arranged between one of the two end electrodes and the center electrode, and wherein another of the two hollow cylindrical insulators is arranged between another of the two end electrodes and the center electrode;

and an external short-circuit device, said external short-circuit device including a two-arm spring clip that extends in the axial direction and has a roof-shaped arch, where the arms of the clip form an obtuse angle and free ends of the arms are in contact with said end electrodes with a layer of insulation in between, said spring clip having a passage in the center through which said connecting wire of the center electrode is guided in such a way that said spring clip is secured on said connecting wire in a pre-stressed state, wherein said free ends of the arms of said spring clip project axially beyond and are in contact with an outside peripheral edge of the respective end electrodes.

2. The surge arrester of claim 1, wherein said spring clip includes two tabs that are in contact with the outside peripheral edge of the respective end electrode.

3. The surge arrester of claim 2, wherein said passage of said spring clip comprises a hole in the area of the roof-shaped arch, said spring clip being secured in the pre-stressed state by means of a pinch sleeve that is slipped over said connecting wire.

4. The surge arrester of claim 2, wherein said passage of said spring clip comprises a hole in the area of said roof shaped arch, said hole having a diameter corresponding to the diameter of the connecting wire, said clip being attached by softer solder to the connecting wire of the center electrode in the pre-stressed state.

5. The surge arrester of claim 2, wherein said passage of said spring clip comprises an H-shape punched out in the area of the roof-shaped arch in order to form two springy tabs, where a distance between the two tabs is smaller than the diameter of said connecting wire connected to said center electrode, and said spring clip is attached to said connecting wire in the pre-stressed state by means of said springy tabs wherein said springy tabs are attached to said connecting wire by bonding.

6. The surge arrester of claim 1, wherein said passage of said spring clip comprises a hole in the area of the roof-shaped arch, said spring clip being secured in the pre-stressed state by means of a pinch sleeve that is slipped over said connecting wire.

7. The surge arrester of claim 1, wherein said passage of said spring clip comprises a hole in the area of said roof shaped arch, said hole having a diameter corresponding to the diameter of the connecting wire, said clip being attached by softer solder to the connecting wire of the center electrode in the pre-stressed state.

8. The surge arrester of claim 1, wherein said passage of said spring clip comprises an H-shape punched out in the area of the roof-shaped arch in order to form two springy tabs, where a distance between the two tabs is smaller than the diameter of said connecting wire connected to said center electrode, and said spring clip is attached to said connecting wire in the pre-stressed state by means of said springy tabs wherein said springy tabs are attached to said connecting wire by bonding.

9. The surge arrester of claim 1, wherein the layer of insulation includes an insulating foil.

* * * * *